(12) United States Patent
Chen et al.

(10) Patent No.: US 10,630,346 B2
(45) Date of Patent: Apr. 21, 2020

(54) CARRIER AGGREGATION UNDER DIFFERENT SUBFRAME STRUCTURES

(71) Applicant: QUALCOMM Incorporated, San Diego, CA (US)

(72) Inventors: Wanshi Chen, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/682,223

(22) Filed: Aug. 21, 2017

(65) Prior Publication Data

US 2018/0062707 A1    Mar. 1, 2018

Related U.S. Application Data

(60) Provisional application No. 62/379,590, filed on Aug. 25, 2016.

(51) Int. Cl.
| | |
|---|---|
| *H04B 7/02* | (2018.01) |
| *H04B 7/024* | (2017.01) |
| *H04W 72/04* | (2009.01) |
| *H04W 28/08* | (2009.01) |
| *H04B 1/00* | (2006.01) |
| *H04L 5/06* | (2006.01) |
| *H04W 52/34* | (2009.01) |
| *H04L 5/00* | (2006.01) |

(Continued)

(52) U.S. Cl.
CPC ........... *H04B 7/024* (2013.01); *H04B 1/0057* (2013.01); *H04L 5/06* (2013.01); *H04W 28/08* (2013.01); *H04W 72/0453* (2013.01); *H04L 5/001* (2013.01); *H04L 5/0028* (2013.01); *H04L 5/12* (2013.01); *H04L 27/0002* (2013.01); *H04W 52/34* (2013.01); *H04W 52/346* (2013.01)

(58) Field of Classification Search
CPC ......... H04B 7/024; H04B 1/0057; H04L 5/06; H04W 72/0453
See application file for complete search history.

(56) References Cited

U.S. PATENT DOCUMENTS

| | | | | |
|---|---|---|---|---|
| 2013/0058294 | A1* | 3/2013 | Miki | ............... H04L 5/0007 370/329 |
| 2013/0114505 | A1* | 5/2013 | Haim | ............... H04W 52/146 370/328 |

OTHER PUBLICATIONS

ETRI: "Frame Structure for New Radio Interface", 3GPP TSG RAN WG1 Meeting #85, R1-164871, May 14, 2016, XP051096290, Retrieved from the Internet: URL:http://www.3gpp.org/ftp/tsg_ran/WG1_RL1/TSGR1_85/Docs/, 3 pages.

(Continued)

*Primary Examiner* — Kabir A Timory
(74) *Attorney, Agent, or Firm* — Patterson & Sheridan, LLP

(57) ABSTRACT

Aspects of the present disclosure provide a method for wireless communication by a wireless communications device in a wireless network, for example, for enabling carrier aggregation (CA) and dual connectivity (DC) under different subframe structures in a 5G system. In certain cases, enabling CA and DC in a 5G system may involve configuring and grouping component carriers based on a numerology criteria associated with each component carrier. The grouped component carriers may then be used to communicate in the wireless network.

26 Claims, 14 Drawing Sheets

(51) Int. Cl.
*H04L 5/12* (2006.01)
*H04L 27/00* (2006.01)

(56) References Cited

OTHER PUBLICATIONS

Huawei, et al., "Discussion on CA Issues for Shortened TTI Operation", 3GPP Draft; R1-167189, 3rd Generation Partnership Project (3GPP), Mobile Competence Centre; 650, Route Des Lucioles; F-06921 Sophia-Antipolis Cedex; France, vol. RAN WG1, no. Gothenburg, Sweden; 20160822-20160826, Aug. 21, 2016 (Aug. 21, 2016), 4 Pages, XP051125764, Retrieved from the Internet: URL: http://www.3gpp.org/ftp/Meetings_3GPP_SYNC/RAN1/Docs/ [retrieved on Aug. 21, 2016].

ITL: "On Frame Structure for NR", 3GPP Draft; R1-167754, 3rd Generation Partnership Project (3GPP), Mobile Competence Centre; 650, Route Des Lucioles; F-06921 Sophia-Antipolis Cedex; France, vol. RAN WG1, no. Gothenburg, Sweden; 20160822-20160826, Aug. 21, 2016 (Aug. 21, 2016), 4 Pages, XP051126076, Retrieved from the Internet: URL: http://www.3gpp.org/ftp/Meetings_3GPP_SYNC/RAN1/Docs/ [retrieved on Aug. 21, 2016].

Ntt Docomo et al., "Discussions on TTI Shortening", 3GPP TSG RAN WG1 Meeting #84, R1-160966, Feb. 14, 2016, XP051054273, Retrieved from the Internet: URL:http://www.3gpp.org/ftp/Meetings_3GPP_SYNC/RAN1/Docs/, 6 pages.

Partial International Search Report—PCT/US2017/047984—ISA/Epo—dated Nov. 22, 2017.

Samsung: "Aggregation of NR Carriers", 3GPP Draft; R1-166806 NR CA, 3rd Generation Partnership Project (3GPP), Mobile Competence Centre; 650, Route Des Lucioles; F-06921 Sophia-Antipolis Cedex; France, vol. RAN WG1, no. Gothenburg, Sweden; 20160822-20160826, Aug. 21, 2016 (Aug. 21, 2016), pp. 1-3, XP051125564, Retrieved from the Internet: URL: http://www.3gpp.org/ftp/Meetings_3GPP_SYNC/RAN1/Docs/ [retrieved on Aug. 21, 2016].

\* cited by examiner

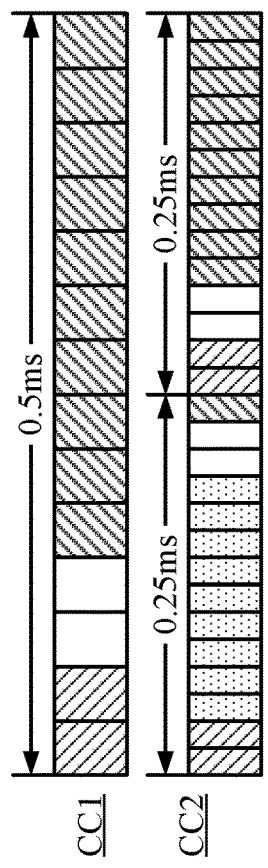
FIG. 13B
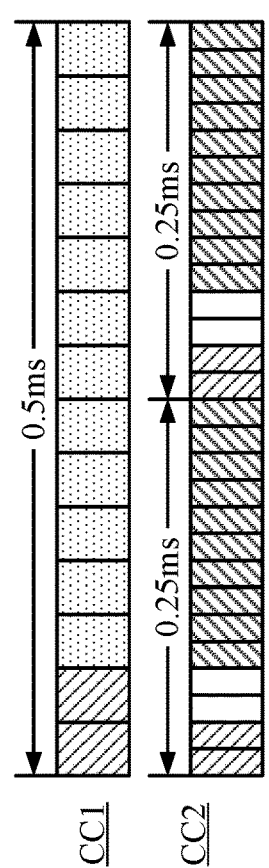
FIG. 13D
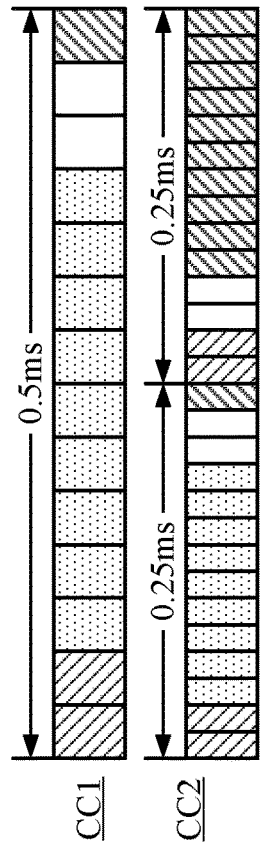
FIG. 13A
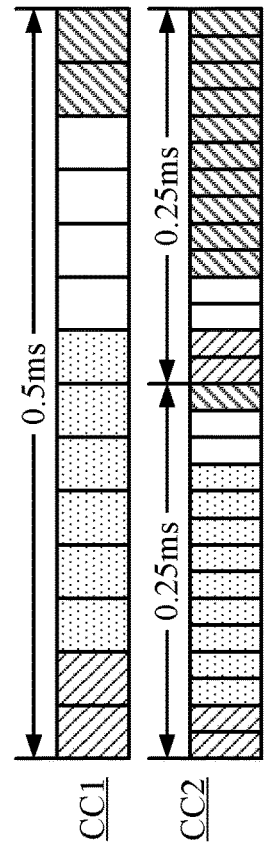
FIG. 13C
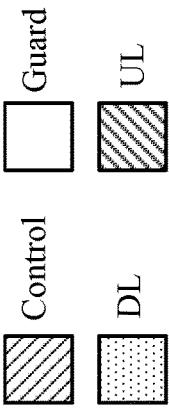

CARRIER AGGREGATION UNDER DIFFERENT SUBFRAME STRUCTURES

CLAIM OF PRIORITY UNDER 35 U.S.C. § 119

This application claims benefit of U.S. Provisional Patent Application Ser. No. 62/379,590, filed Aug. 25, 2016, which is herein incorporated by reference in its entirety.

FIELD OF THE DISCLOSURE

The technology discussed herein relates, generally, to wireless communication systems, and, more particularly, to carrier aggregation (CA) under different subframe structures in 5G technologies.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in 5G technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between access points and stations in a wireless network.

Devices in a wireless network may communicate using different modes of communication. For example, in some cases, devices (e.g., a base station and/or user equipment) may use a carrier aggregation (CA) mode where a plurality of (continuous and/or disjoint) aggregated component carriers is used for communication. In other cases, a device, such as a user equipment, may use a dual connectivity (DC) mode, for example, where the user equipment communicates with two base stations simultaneously. However, due to the variable nature of subframe structures and numerologies in 5G, CA and DC for 5G may be challenging.

Thus, aspects of the present disclosure present techniques for enabling carrier aggregation/dual connectivity under different subframe structures/numerologies in 5G. For example, in some cases, enabling DC and CA in 5G may involve determining groups of component carriers to use for communication based on subframe structures/numerologies of the underlying component carriers. For example, in some cases, the wireless communications device may group component carriers with a same numerology in a first group and group other component carriers with different numerologies (e.g., different from the component carriers in the first group) in a second group. In some cases, grouping component carriers based on numerologies of the component carriers may help reduce interference between component carriers with different numerologies complexity in downlink control and/or uplink control management.

Aspects of the present disclosure provide a method for wireless communication by a wireless communications device in a wireless network. The method generally includes identifying a configuration of a plurality of component carriers (CCs) for communicating in a carrier aggregation (CA) mode or a dual connectivity (DC) mode, determining, from the plurality of CCs, a plurality of different CC groups based on a numerology criteria associated with each CC of the plurality of CCs, and communicating using the plurality of different CC groups.

Aspects of the present disclosure provide an apparatus for wireless communication in a wireless network. The apparatus generally includes at least one processor configured to identify a configuration of a plurality of component carriers (CCs) for communicating in a carrier aggregation (CA) mode or a dual connectivity (DC) mode, determine, from the plurality of CCs, a plurality of different CC groups based on a numerology criteria associated with each CC of the plurality of CCs, and communicate using the plurality of different CC groups. The apparatus also generally includes a memory coupled with the at least one processor.

Aspects of the present disclosure provide an apparatus for wireless communication in a wireless network. The apparatus generally includes means for identifying a configuration of a plurality of component carriers (CCs) for communicating in a carrier aggregation (CA) mode or a dual connectivity (DC) mode, means for determining, from the plurality of CCs, a plurality of different CC groups based on a numerology criteria associated with each CC of the plurality of CCs, and means for communicating using the plurality of different CC groups.

Aspects of the present disclosure provide a non-transitory computer-readable medium for wireless communication by a wireless communications device in a wireless network. The non-transitory computer-readable medium generally includes instructions for identifying a configuration of a plurality of component carriers (CCs) for communicating in a carrier aggregation (CA) mode, determining, from the plurality of CCs, a plurality of different CC groups based on a numerology criteria associated with each CC of the plurality of CCs, and communicating using the plurality of different CC groups.

Aspects of the present disclosure provide a method for wireless communication by a wireless communications device in a wireless network. The method generally includes identifying a configuration of a plurality of component carriers (CCs) for communicating in a carrier aggregation (CA) mode or a dual connectivity (DC) mode, determining, from the plurality of CCs, a plurality of different CC groups based on a numerology criteria associated with each CC of the plurality of CCs, wherein the plurality of different CC groups comprises a first CC group comprising at least a first CC and a second CC group comprising at least a second CC, wherein the first CC comprises a first symbol duration and the second CC comprises a second symbol duration, and communicating using the plurality of different CC groups.

Aspects of the present disclosure provide an apparatus for wireless communication in a wireless network. The apparatus generally includes at least one processor configured to identify a configuration of a plurality of component carriers (CCs) for communicating in a carrier aggregation (CA) mode or a dual connectivity (DC) mode, determine, from the plurality of CCs, a plurality of different CC groups based on a numerology criteria associated with each CC of the plurality of CCs, wherein the plurality of different CC groups comprises a first CC group comprising at least a first CC and a second CC group comprising at least a second CC, wherein the first CC comprises a first symbol duration and the second CC comprises a second symbol duration, and communicate using the plurality of different CC groups. The apparatus also generally includes a memory coupled with the at least one processor.

Aspects of the present disclosure provide an apparatus for wireless communication in a wireless network. The apparatus generally includes means for identifying a configuration of a plurality of component carriers (CCs) for communicating in a carrier aggregation (CA) mode or a dual connectivity (DC) mode, means for determining, from the plurality of CCs, a plurality of different CC groups based on a numerology criteria associated with each CC of the plurality of CCs, wherein the plurality of different CC groups comprises a first CC group comprising at least a first CC and a second CC group comprising at least a second CC, wherein the first CC comprises a first symbol duration and the second CC comprises a second symbol durations, and means for communicating using the plurality of different CC groups.

Aspects of the present disclosure provide a non-transitory computer-readable medium for wireless communication by a wireless communications device in a wireless network. The non-transitory computer-readable medium generally includes instructions for identifying a configuration of a plurality of component carriers (CCs) for communicating in a carrier aggregation (CA) mode, determining, from the plurality of CCs, a plurality of different CC groups based on a numerology criteria associated with each CC of the plurality of CCs, wherein the plurality of different CC groups comprises a first CC group comprising at least a first CC and a second CC group comprising at least a second CC, wherein the first CC comprises a first symbol duration and the second CC comprises a second symbol duration, and communicating using the plurality of different CC groups.

BRIEF DESCRIPTION OF THE DRAWINGS

FIGS. 13A-13D illustrate additional examples of combinations of component carriers for carrier aggregation in new radio system with different subframe durations and different subframe structures, according to certain aspects of the present disclosure.

DETAILED DESCRIPTION

Figure 1:
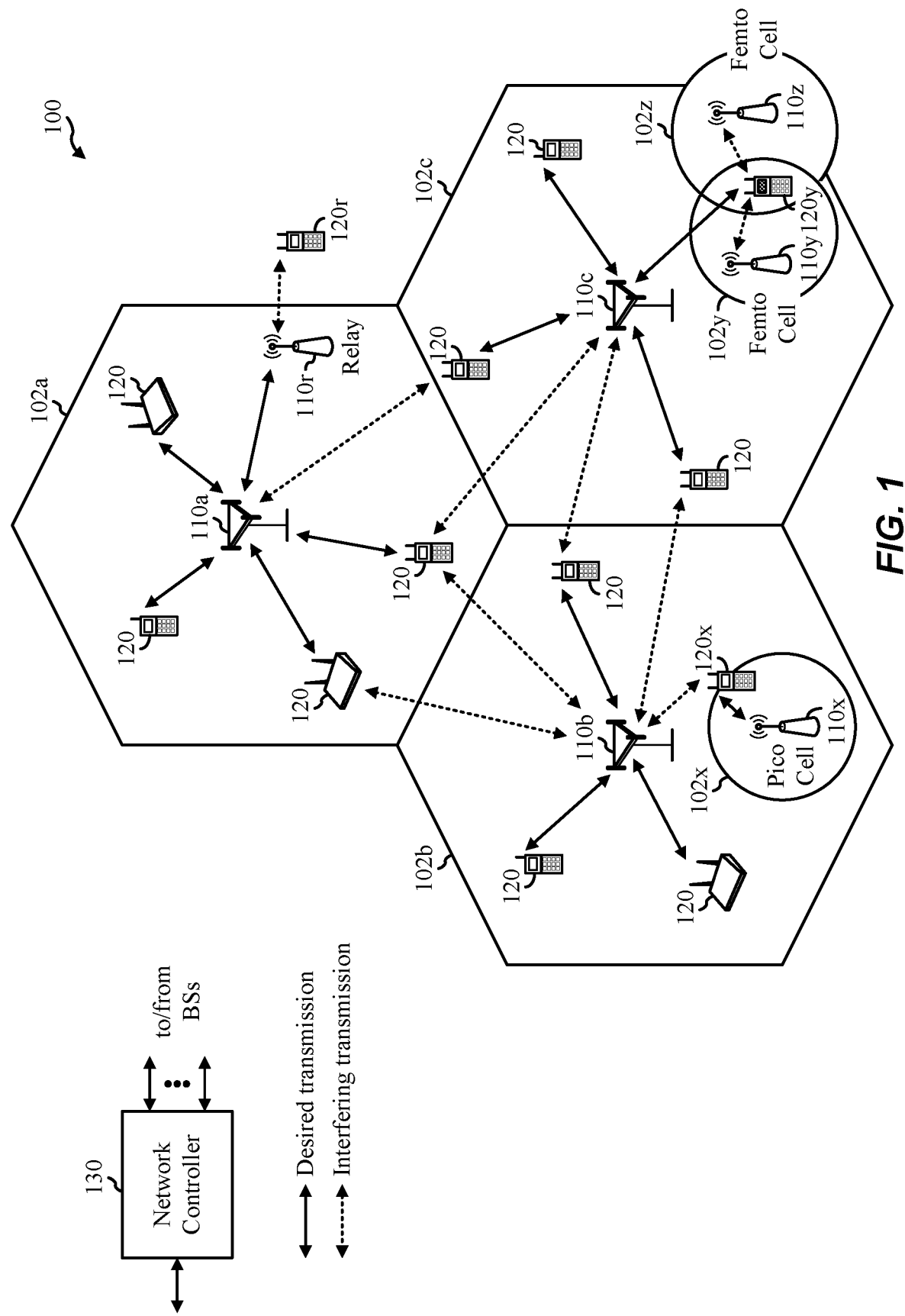
FIG. 1 is a block diagram conceptually illustrating an example telecommunications system, in accordance with certain aspects of the present disclosure.

Aspects of the present disclosure provide apparatus, methods, processing systems, and computer readable mediums for multi-slice networks, such as new radio (NR) (new radio access technology or 5G technology).

5G may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI), subframe structures, and numerologies to meet respective quality of service (QoS) requirements. In addition, these services may co-exist in the same subframe.

In some cases, carrier aggregation (CA) and/or dual connectivity (DC) may be used for communication between a user equipment and the network (e.g., one or more base stations). Carrier aggregation occurs when the UE communicates with a base station using a plurality of (continuous and/or disjoint) aggregated component carriers and DC occurs when a UE communicates (e.g., receives data) from two eNBs simultaneously. In LTE, CA and DC were restricted to using component carriers with a same numerology. However, as noted above, due to the variable nature subframe structures and numerologies in 5G, CA and DC for 5G may be challenging.

Thus, aspects of the present disclosure present techniques for enabling carrier aggregation/dual connectivity under different subframe structures/numerologies in NR.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, such as a 5G network.

Example Wireless Communications System

FIG. 1 illustrates an example wireless network 100, such as a 5G network, in which aspects of the present disclosure may be performed. For example, techniques presented herein may be used to enable carrier aggregation (CA) and/or dual connectivity (DC).

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In 5G systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, 5G RAT networks may be deployed, employing a multi-slice network architecture.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

5G may utilize OFDM with a CP on the uplink and downlink and include support for half-duplex operation using TDD. A single component carrier bandwidth of 100 MHz may be supported. 5G resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for 5G may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based. 5G networks may include entities such CUs and/or one or more DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and one or more DUs. A 5G BS (e.g., gNB, 5G Node B, Node B, transmission reception point (TRP), access point (AP)) may correspond to one or multiple BSs. 5G cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. 5G BSs may transmit downlink signals to UEs indicating the cell type. Based on the cell type indication, the UE may communicate with the 5G BS. For example, the UE may determine 5G BSs to consider for cell selection, access, handover, and/or measurement based on the indicated cell type.

Figure 2:
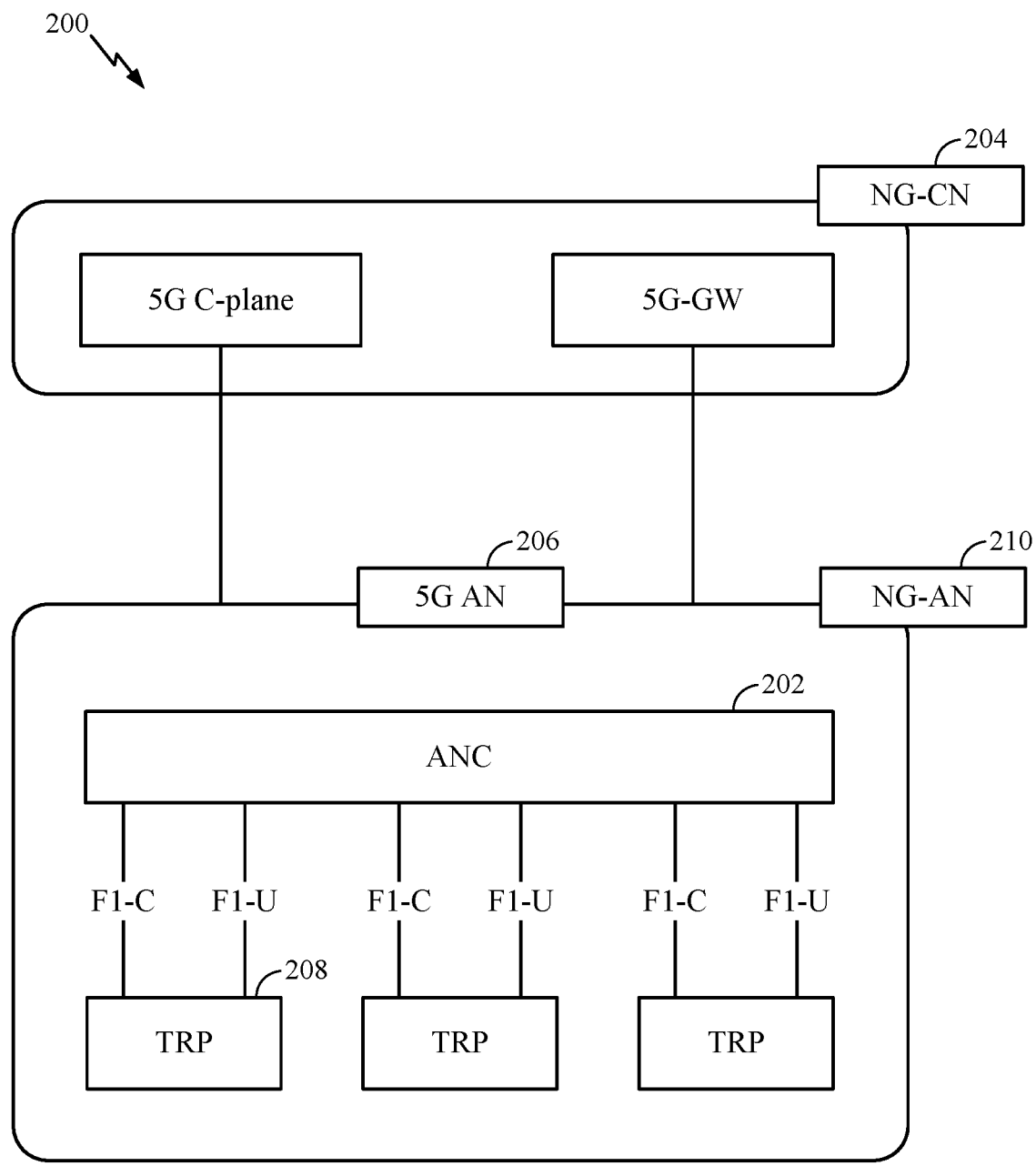
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNB, or some other term). As described above, a TRP may be used interchangeably with "cell" and may refer to a region where a same set of radio resources are available throughout the region.

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture of the distributed RAN 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
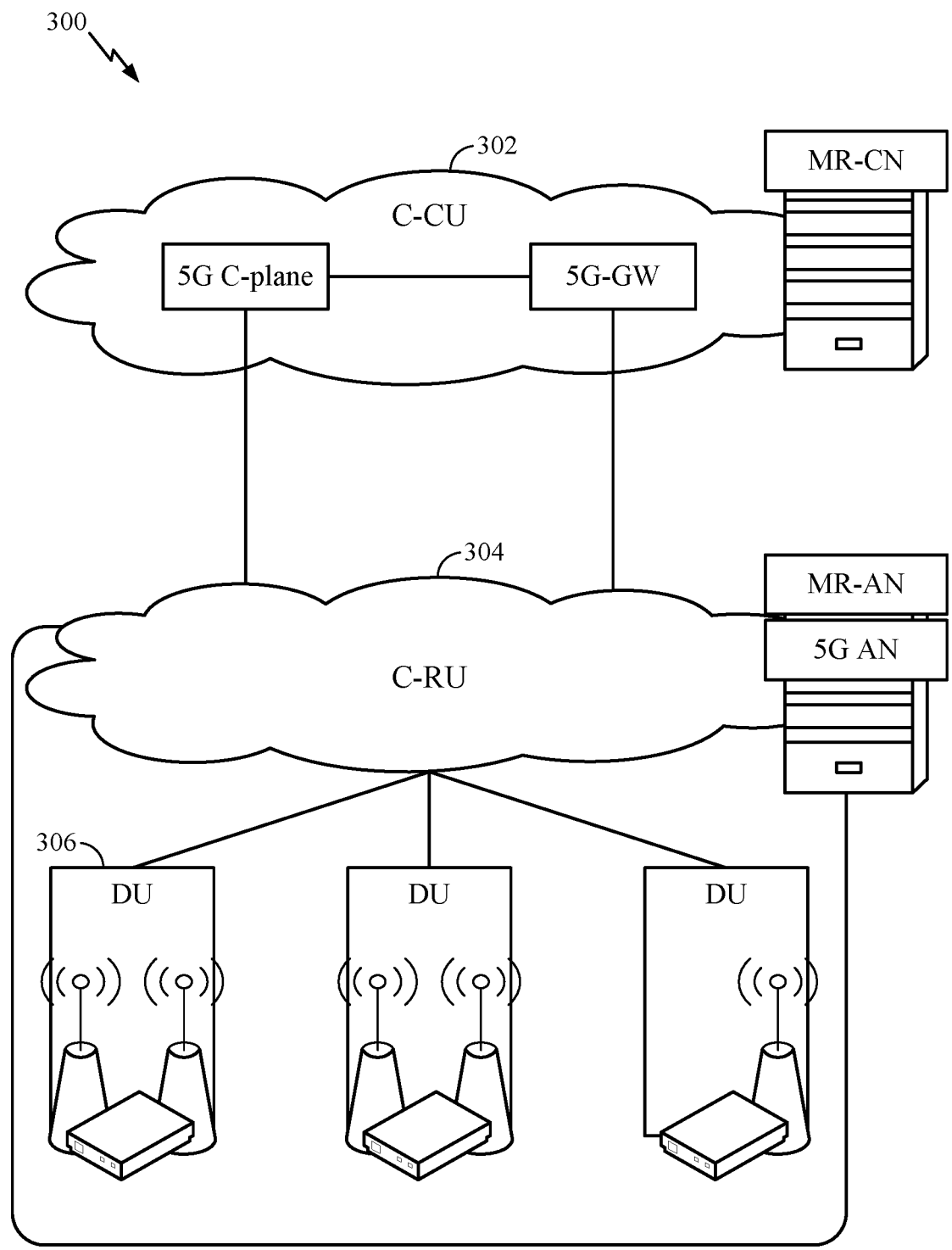
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
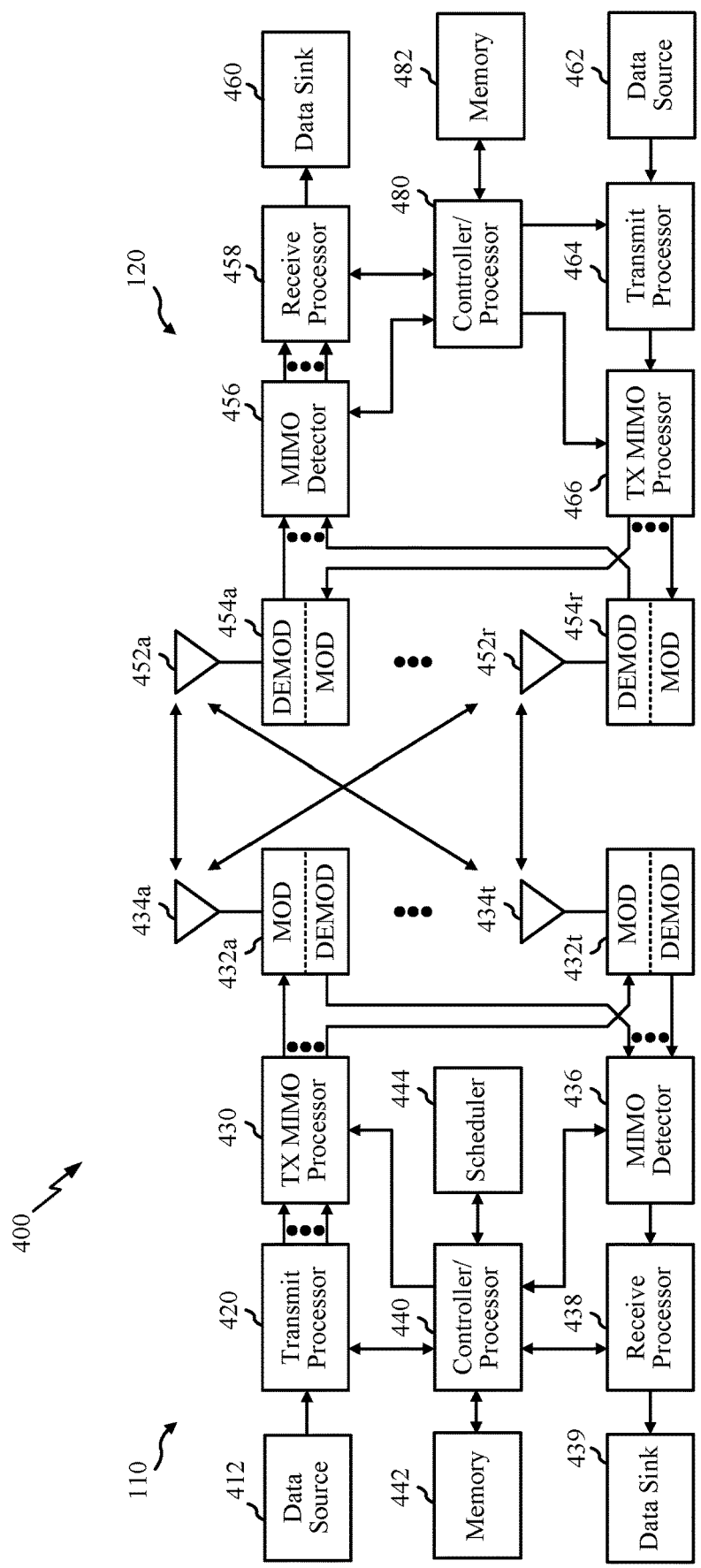
FIG. 4 is a block diagram conceptually illustrating a design of an example BS and user equipment (UE), in accordance with certain aspects of the present disclosure.

FIG. 4 illustrates example components 400 of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 420, 430, 438, and/or controller/processor 440 of the BS 110 may be used to perform the operations described herein and illustrated with reference to FIG. 11.

According to aspects, for a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 12, and/or other processes for the techniques described herein. The processor 480 and/or other processors and modules at the UE 120 may also perform or direct, e.g., the execution of the functional blocks illustrated in FIG. 8 and/or 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
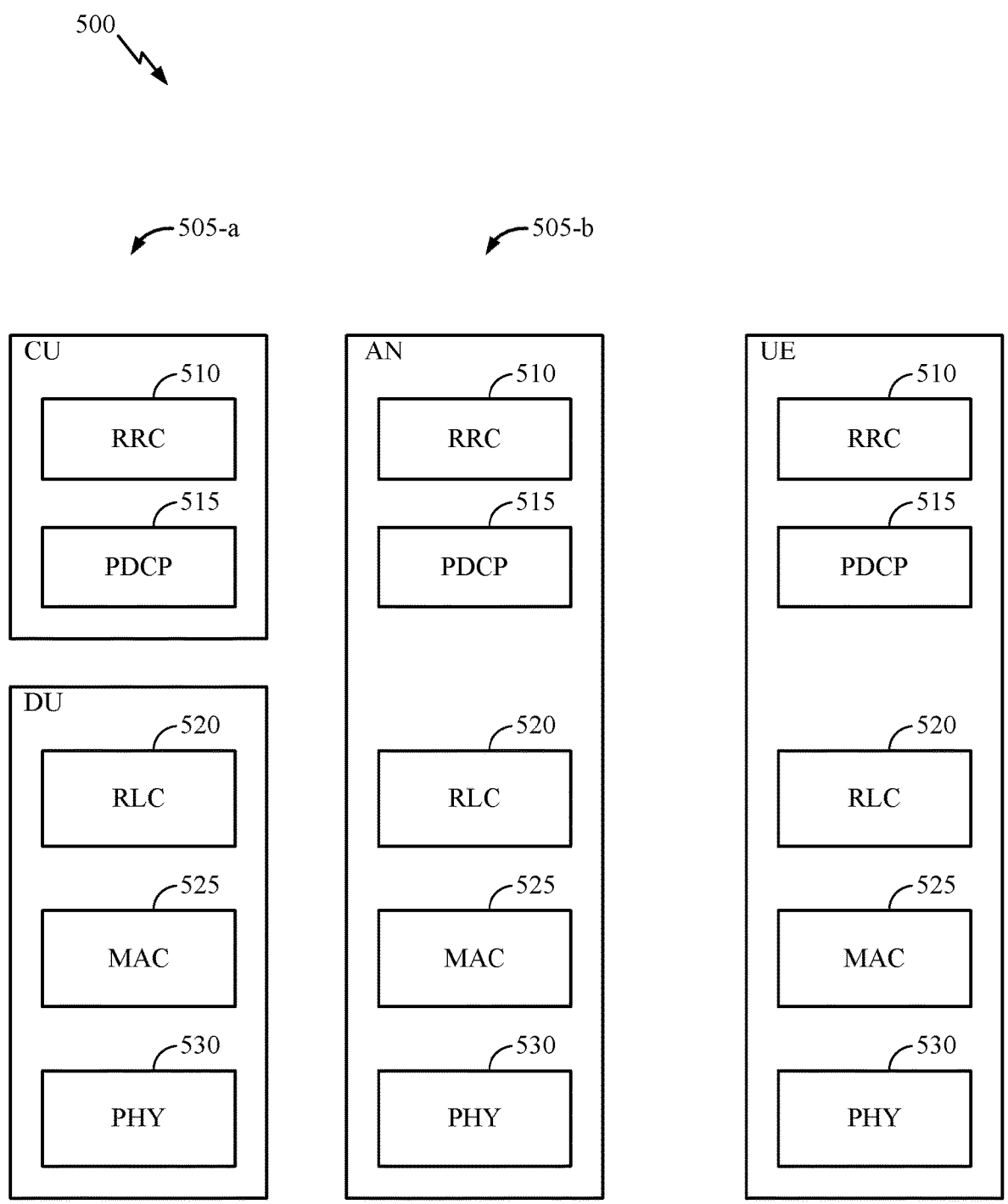
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or one or more DUs) or a UE.

A first option 505-a shows a split implementation of a protocol stack, in which implementation of the protocol stack is split between a centralized network access device (e.g., an ANC 202 in FIG. 2) and distributed network access device (e.g., TRP 208 in FIG. 2, which may also be known as a DU). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), 5G BS, 5G NB, or the like). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
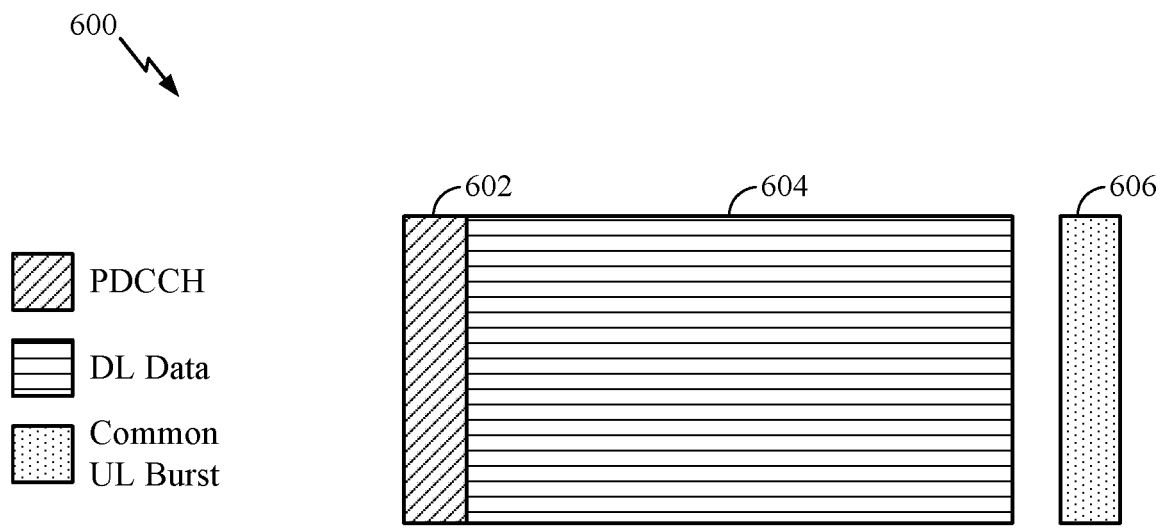
FIG. 6 illustrates an example of a DL-centric subframe, in accordance with certain aspects of the present disclosure.

FIG. 6 is a diagram 600 showing an example of a DL-centric subframe, which may be used to communicate in the wireless network 100. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
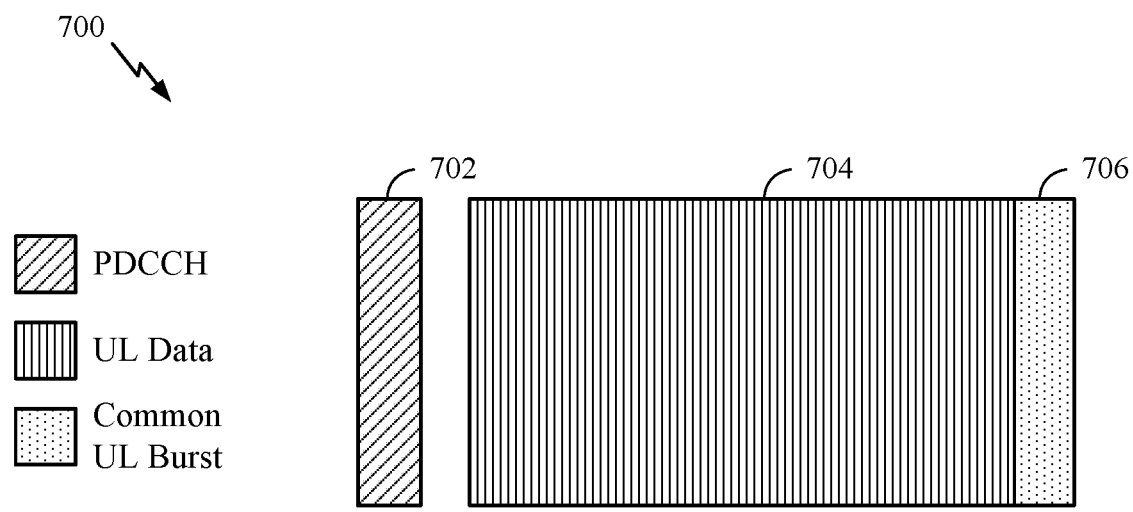
FIG. 7 illustrates an example of an UL-centric subframe, in accordance with certain aspects of the present disclosure.

FIG. 7 is a diagram 700 showing an example of an UL-centric subframe, which may be used to communicate in the wireless network 100. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Carrier Aggregation

Figure 8:
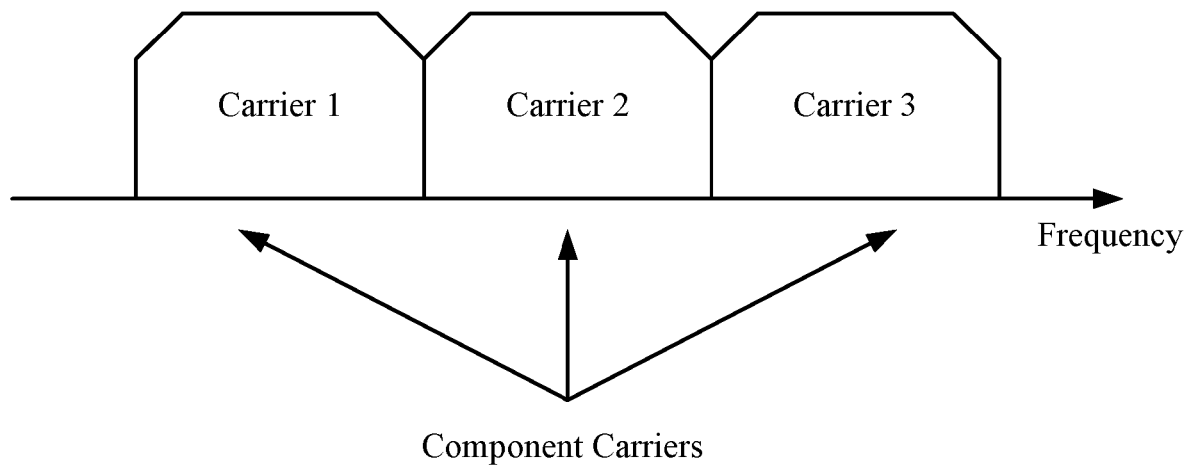
FIG. 8 illustrates an example continuous carrier aggregation type, according to aspects of the present disclosure.
Figure 9:
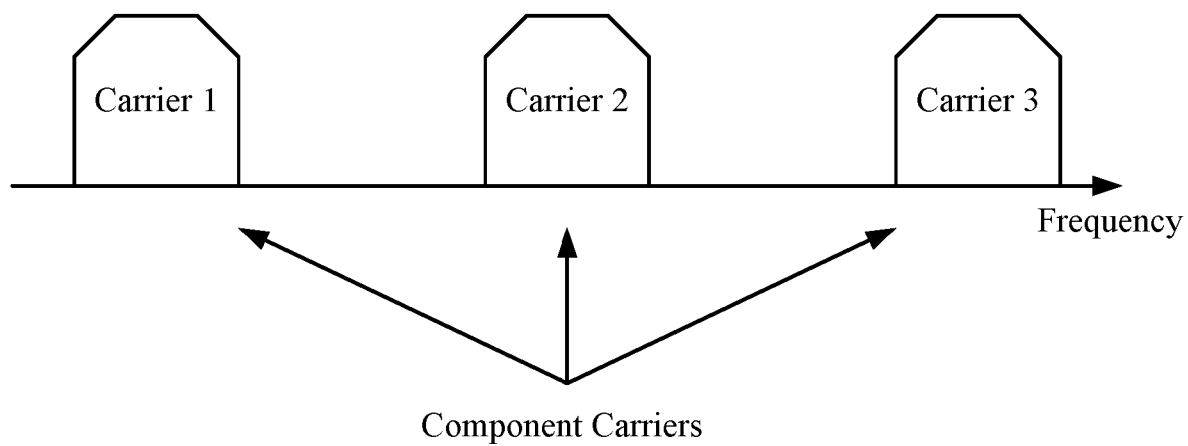
FIG. 9 illustrates an example non-continuous carrier aggregation type, according to aspects of the present disclosure.

In some cases, UEs may use spectrum of up to 20 MHz bandwidths allocated in a carrier aggregation of up to a total of 100 MHz (5 component carriers) used for transmission in each direction. For certain mobile systems (e.g., LTE-Advanced), two types of carrier aggregation (CA) methods have been proposed, continuous CA and non-continuous CA, which are illustrated in FIGS. 8 and 9. Continuous CA occurs when multiple available component carriers are adjacent to each other, for example, as illustrated in FIG. 7. On the other hand, non-continuous CA occurs when multiple available component carriers are separated along the frequency band, for example as illustrated in FIG. 8 Both non-continuous and continuous CA aggregates multiple component carriers to serve a single UE (e.g., one or more of the UEs illustrated in FIG. 1).

According to various aspects, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH).

It should be noted that while the preceding specifically refers to CA for LTE-Advanced UEs, the same general concept of CA applies to other types of UEs and base stations (e.g., BSs/UEs configured to operate in a new radio (NR) system according to a 5G specification), for example as explained in greater detail below.

Example Dual Connectivity

Figure 10:
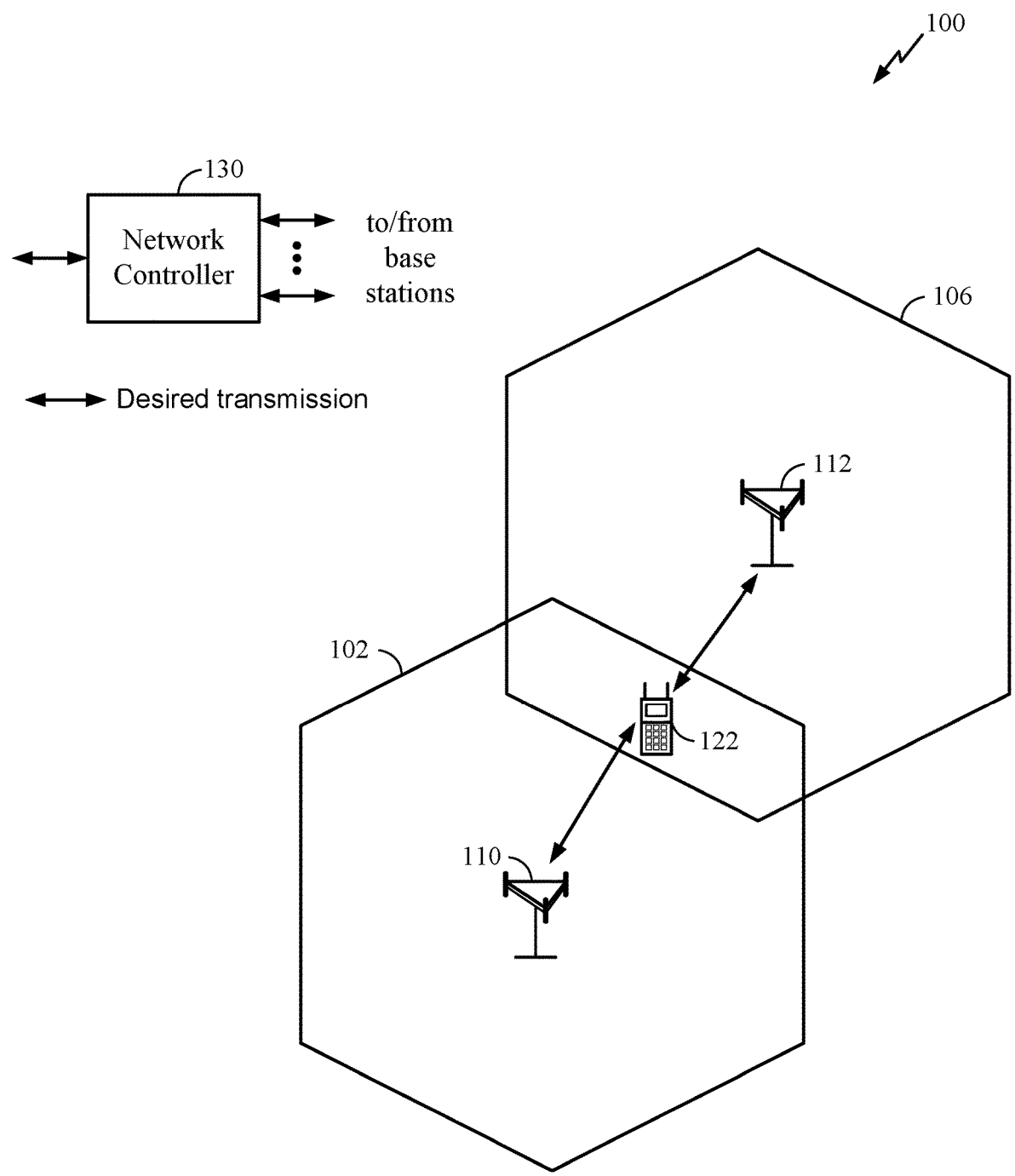
FIG. 10 illustrates an example dual connectivity scenario using multiflow to deliver simultaneous data streams, according to aspects of the present disclosure.

Presently, mobiles devices (e.g., UEs) receive data from one base station (e.g., eNB). However, users on a cell edge may experience high inter-cell interference which may limit the data rates. Multiflow allows users to receive data from two eNBs simultaneously. For example, as illustrated in the wireless network 100, UE 122 sends and receives data from the two eNBs 110 and 112 in two separate streams when UE 122 is in range of two cell towers in two adjacent cells 102 and 106 at the same time. The UE 122 communicates with the two towers simultaneously when the UE 122 is on the edge of either towers' reach (e.g., as shown in FIG. 10). By scheduling (e.g., via network controller 130) two independent data streams to the UE 122 from two different eNBs 110 and 112 at the same time, multiflow exploits uneven loading in networks. This helps improve the cell-edge user experience while increasing network capacity. In one example, throughput data speeds for users at a cell edge may double. "Multiflow" is similar to dual-carrier HSPA, however, there are differences. For example, dual-carrier HSPA does not allow for connectivity to multiple towers to connect simultaneously to a device.

Dual connectivity may have benefits in the cellular industry. Dual Connectivity can significantly improve per-user throughput and mobility robustness by allowing users to be connected simultaneously to master cell group (MCG) and secondary cell group (SCG) via master eNB (MeNB) (e.g., 110) and secondary eNB (SeNB) (e.g., 112), respectively. The increase in per-user throughput is achieved by aggregating radio resources from at least two eNBs (e.g., 110 and 112). Moreover, dual connectivity also helps in load balancing between MCG and SCG.

The MeNB and SeNB may not be collocated and can be connected via a non-ideal backhaul (e.g., backhaul). Thus, the different eNBs may use different schedulers, etc. For example, the UE 122 may be dually connected to a macro cell and the small cell, and the eNBs may be connected via a non-ideal backhaul and operate on different carrier frequencies. With carrier aggregation, multiple LTE/component carriers are aggregated to serve a single UE (e.g., one or more of the UEs illustrated in FIG. 1).

In certain aspects, due to the distributed nature of this deployment scenario (separate eNBs connected via a non-ideal backhaul) separate uplink control channels for both eNBs (MeNB and SeNB) are used to support distributed scheduling and independent MAC (Medium Access Control) operation across eNBs. This is unlike CA (Carrier Aggregation) deployment, in which a single MAC/scheduling entity operates across all the carriers and a single uplink control channel is used.

In certain systems, the Primary Cell (PCell of MeNB) is the only cell carrying the uplink control channels (e.g., the PUCCH). For dual connectivity, a special cell on the SeNB may support the uplink control channels for the SeNB. Also, with dual connectivity uplink control channels for both the MeNB and the SeNB are used, one for each eNB.

Example Carrier Aggregation Under Different Subframe Structures

Aspects of the present disclosure present techniques for facilitating carrier aggregation (CA) and/or dual connectivity (DC), as described above, in a 5G radio system.

As noted above, a new air interface is being introduced for 5G, including features that include Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and Polar codes.

According to certain aspects, base stations/UEs configured to operate in a 5G system may use similar techniques for carrier aggregation (CA) and/or dual connectivity (DC), as described above, for communicating in the 5G system.

Carrier aggregation was first introduced in LTE Release 10, in which a UE was able to communicate with a base station by aggregating two different frequency division duplexing (FDD) component carriers (CCs) or two different time division duplexing (TDD) CCs (e.g., where the two TDD CCs were of a same subframe configuration). In LTE Release 11, CA was further enhanced by allowing a UE to aggregate TDD CCs of different subframe configurations. Additionally, in LTE Release 12, FDD+TDD carrier aggregation was introduced, which allowed a UE to aggregate a FDD CC with a TDD CC to communicate with a base station. Further, LTE Release 12 introduced dual connectivity (DC), in which a UE may communicate with two different base stations using two different groups of CCs. Further, in LTE Release 13, CA was further enhanced by allowing a UE to aggregate more than five CCs, for example, up to 32 CCs. While there have been many enhancements, CA and DC in LTE has been limited to using CCs with a same numerology (e.g., subframe duration, subframe structure, symbol duration, transmit time interval (TTI) duration, tone spacing, etc.).

However, 5G systems are expected to cover a wide range of carrier frequencies, subframe structures, and numerologies. For example, 5G systems are expected to allow communication using sub-6 GHz CCs, mmW CCs, and more. Each of these different CCs may have different subframe durations (e.g., 0.5 ms, 0.25 ms, etc.) and different, scalable numerologies/tone spacings (e.g., 15 kHz, 30 kHz, 60 kHz, 120 kHz, etc.). Additionally, scalable numerologies may also include scalable transmission time intervals (TTIs). Therefore, implementing carrier aggregations/dual connectivity for 5G may be challenging due to the variable nature of carrier frequencies, subframe structures, and numerologies in NR.

Thus, aspects of the present disclosure present techniques for enabling carrier aggregation/dual connectivity under different subframe structures/numerologies in NR. In some cases, enabling carrier aggregation/dual connectivity in 5G may involve configuring a plurality of CCs, grouping the CCs based on a numerology criteria associated with each CC, and communicating using the grouped CCs.

Figure 11:
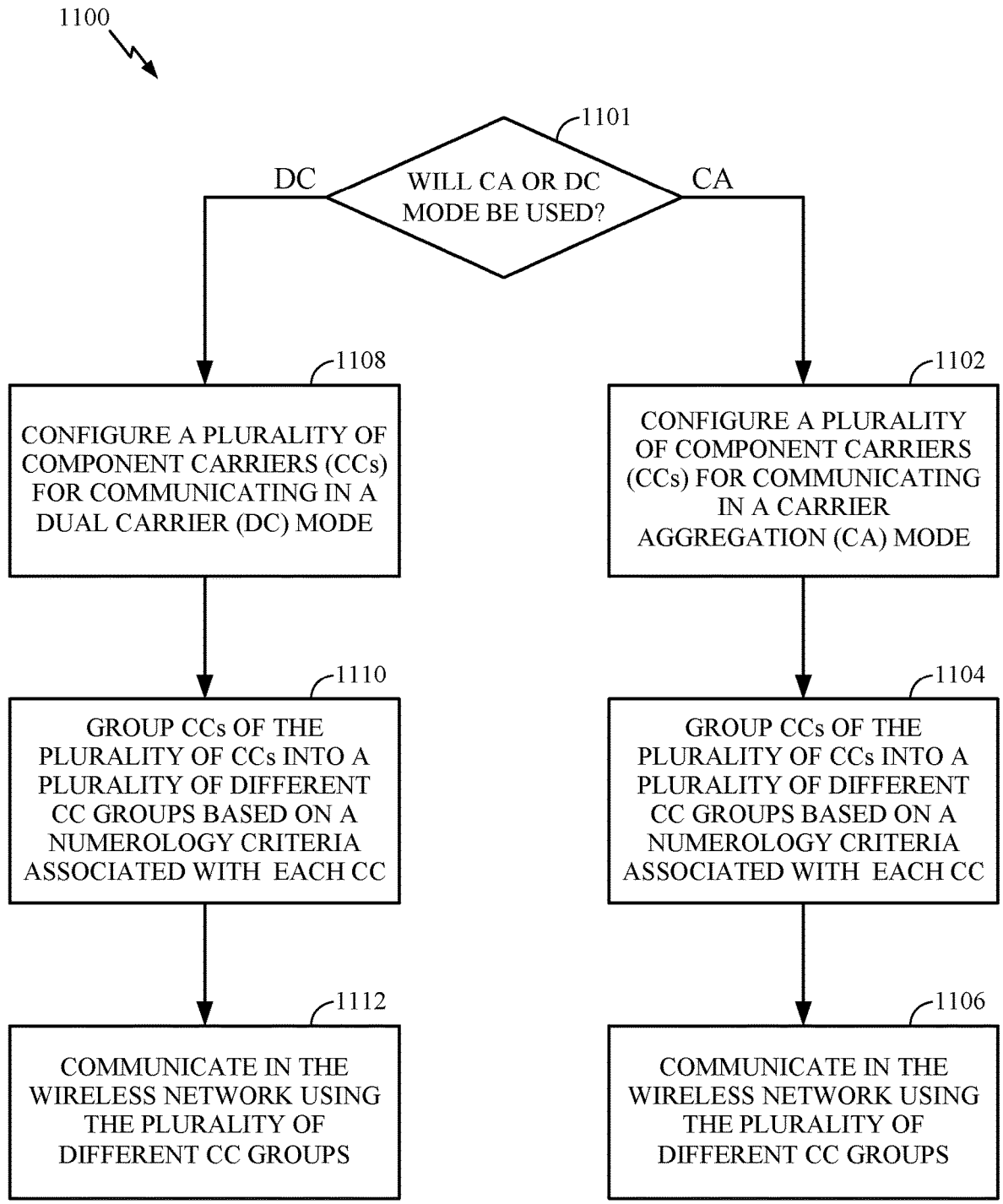
FIG. 11 is a flow diagram illustrating example operations for wireless communications, according to certain aspects of the present disclosure.

FIG. 11 illustrates example operations 1100 for wireless communication in a wireless communications network (e.g., wireless network 100). Operations 1100 may be performed, for example, by a wireless communications device, such as a base station (e.g., BS 110) or a UE (e.g., UE 120) for enabling carrier aggregation/dual connectivity under different subframe structures in NR.

According to certain aspects, the base station may include one or more components as illustrated in FIG. 4 that may be configured to perform the operations described herein. For example, the antenna 434, demodulator/modulator 432, controller/processor 440, and/or memory 442 as illustrated in FIG. 4 may perform the operations described herein. Additionally, the UE may include one or more components as illustrated in FIG. 4 that may be configured to perform the operations described herein. For example, the antenna 452, demodulator/modulator 454, controller/processor 480, and/or memory 482 as illustrated in FIG. 4 may perform the operations described herein.

Operations 1100 begin at step 1101 by determining whether carrier aggregation (CA) or dual carrier (DC) mode will be used.

At step 1102, the wireless communications device identifies a configuration of a plurality of component carriers (CCs) for communicating in a carrier aggregation (CA) mode. For example, in some cases, the wireless communications device determines that a first CC, a second CC, and a third CC may be used for communicating in a CA mode.

At step 1104, the wireless communications device determines, from the plurality of CCs, a plurality of different CC groups based on a numerology criteria associated with each CC of the plurality of CCs. According to certain aspects, the numerology criteria may comprise at least one of a subframe duration, a subframe structure, a symbol duration, a transmit time interval (TTI) duration, or a tone spacing associated with a particular CC. For example, at step 1104, the wireless communications device may group the first CC, second CC, and third CC into different CC groups based on a numerology criteria associated with each of these CCs. According to aspects, in some cases, CCs with a same numerology may be grouped into a same CC group while CCs with different numerologies may be grouped in one or more other CC groups.

At step 1106, the wireless communications device communicates (e.g., in the wireless network) using the plurality of different CC groups.

At step 1108, the wireless communications device identifies a configuration of a plurality of component carriers (CCs) for communicating (e.g., in a dual carrier (DC) mode), for example, if at step 1101 the wireless communications device determines to use a DC mode for communication. For example, in some cases, the wireless communications device determines that the first CC, the second CC, and the third CC may be used for communicating in a DC mode.

At step 1110, the wireless communications device determines, from the plurality of CCs, a plurality of different CC groups based on a numerology criteria associated with each CC of the plurality of CCs. According to aspects, the steps performed by the wireless communications device at step 1110 may be similar to those steps performed at 1104 described above.

At step 1112, the wireless communications device communicates (e.g., in the wireless network) using the plurality of different CC groups. According to aspects, the steps performed by the wireless communications device at step 1112 may be similar to those steps performed at 1106 described above.

Figure 11A:
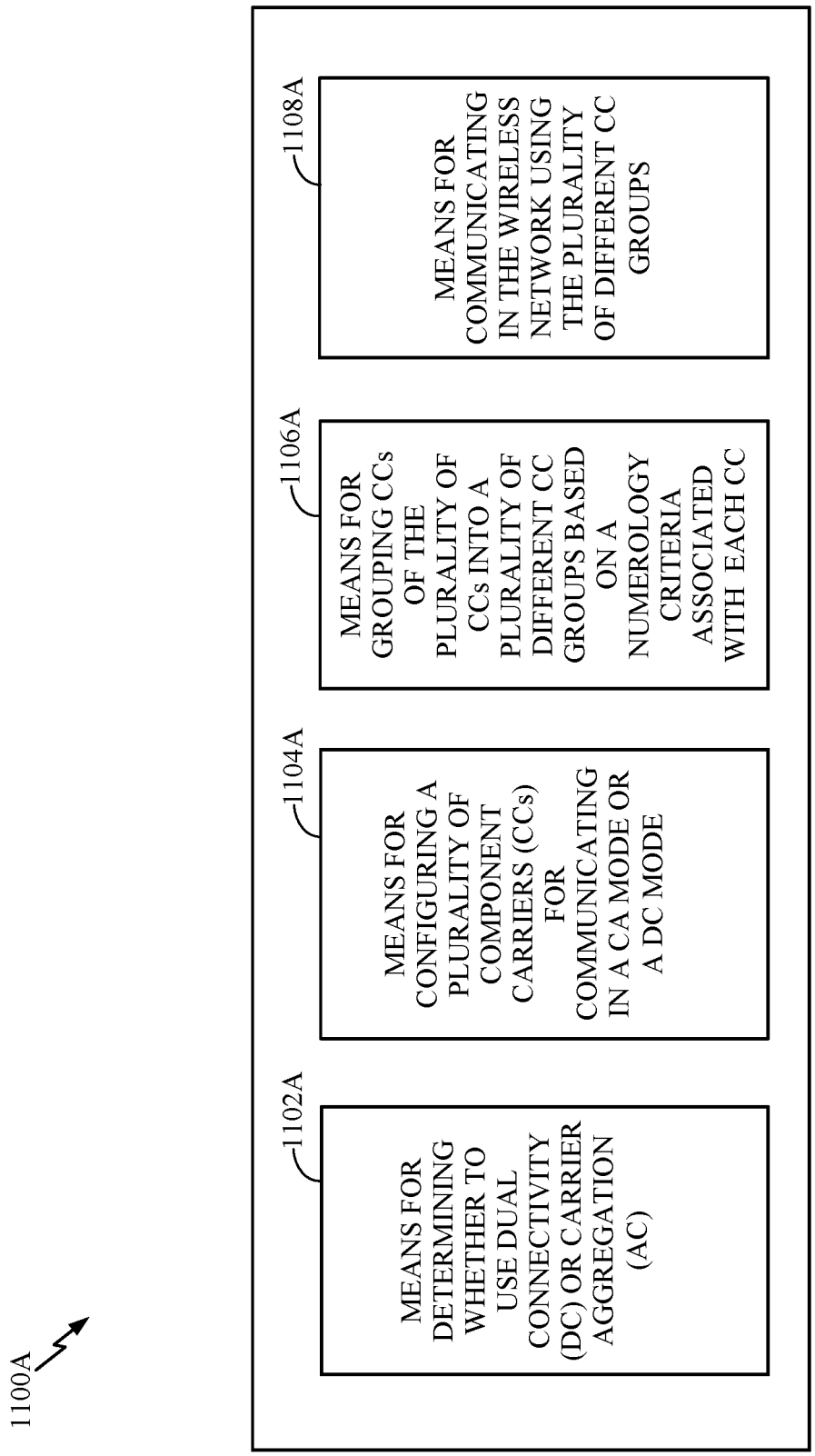
FIG. 11A shows a communication device illustrating means for performing operations for wireless communications, according to certain aspects of the present disclosure.

FIG. 11A illustrates a communications device 1100A that may include various means-plus-function components configured to perform the operations illustrated in FIG. 11. For example, at 1102A, the communications device 1100A includes means for performing the operations illustrated at 1101 in FIG. 11. Additionally, at 1104A, the communications device 1100A includes means for performing the operations illustrated at 1102 and 1104 in FIG. 11. Further, at 1106A, the communications device 1100A includes means for performing the operations illustrated at 1104 and 1110 in FIG. 11. Additionally, at 1108A, the communications device 1100A includes means for performing the operations illustrated at 1106 and 1112 in FIG. 11.

Figure 12:
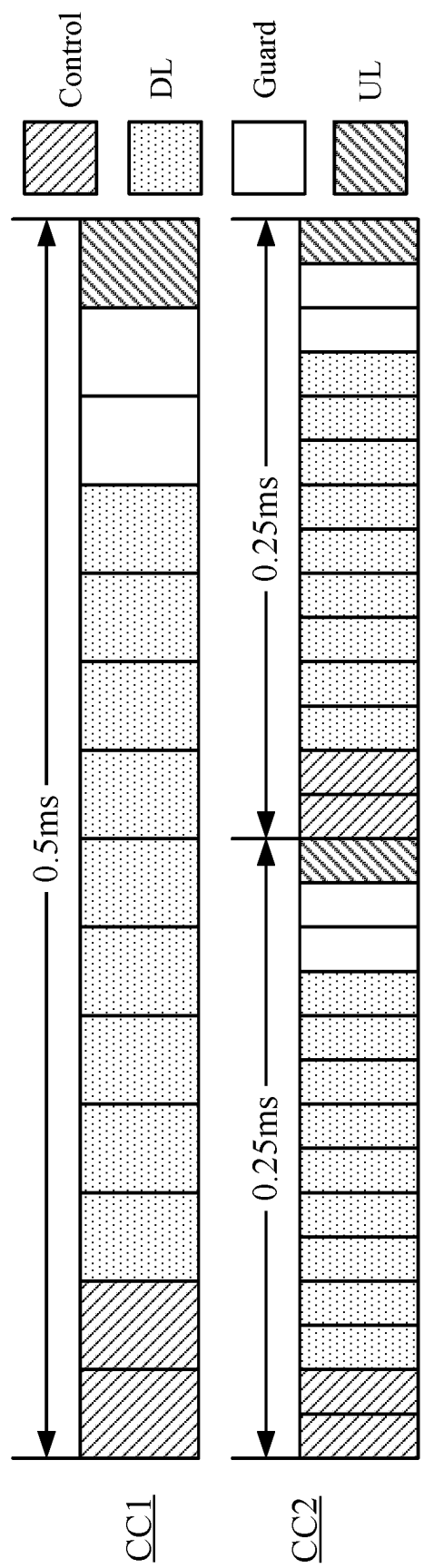
FIG. 12 illustrates an example combination of component carriers for carrier aggregation in a new radio system, according to certain aspects of the present disclosure

FIG. 12 illustrates an example of CA in a 5G system, according to certain aspects of the present disclosure. For example, as illustrated, in a 5G system, carrier aggregation may be enabled using two different component carriers, CC1 and CC2, with different numerologies. For example, CC1 may use 30 kHz tone spacing and a subframe with a duration of 0.5 ms with 14 symbols, while CC2 may use a 60 kHz tone spacing and a subframe with a duration of 0.25 ms with 14 symbols. In some cases, it is possible that a CC with 60 kHz tone spacing will use a subframe with a duration of 0.5 ms subframe; however, in such a case, this CC may have different TTIs for scheduling.

According to aspects, a UL centric subframe (e.g., as illustrated in FIG. 7) may be used for transmitting UL data from one or more mobile stations to a base station, and a DL centric subframe (e.g., as illustrated in FIG. 6) may be used for transmitting DL data from the base station to the one or more mobile stations. Examples of UL centric subframes and DL subframes are discussed further below. In one example, a frame may include both UL centric subframes and DL centric subframes. In this example, the ratio of UL centric subframes to DL subframes in a frame may be dynamically adjusted based on the amount of UL data and the amount of DL data that need to be transmitted. For example, if there is more UL data, then the ratio of UL centric subframes to DL subframes may be increased. Conversely, if there is more DL data, then the ratio of UL centric subframes to DL subframes may be decreased.

FIGS. 13A-13D illustrate additional examples of combinations of CCs for carrier aggregation in 5G with different subframe durations and different subframe structures. Each subframe may be subject different structures: DL-centric (and different configurations of DL/GP/UL durations), UL-centric (and different configurations of DL/GP/UL durations), DL-only, UL-only, etc. For example, FIGS. 13A-13B illustrate different CCs using UL-centric subframes (e.g., similar to the UL-centric subframe illustrated in FIG. 7). For example, FIG. 13A illustrates that the second subframe of CC2 may be using an UL-centric subframe structure, while FIG. 13B illustrates the use of a UL-centric subframe in CC1. Further, FIG. 13C illustrates that the subframe transmitted on CC1 may comprise a longer guard period (e.g., as compared to the subframe transmitted on CC1 in FIG. 13A). Additionally, FIG. 13D illustrates that a pure DL subframe (with the exception of a couple control symbols) could be transmitted on CC1 while the subframes transmitted on CC2 may be UL-centric subframes.

In LTE, different link directions (e.g., a first CC transmits DL while a second CC transmits UL) are allowed if the CCs are of different bands. In other words, CCs within a same band should use the same link directions, otherwise the CCs may experience cross CC interference. LTE additionally has the restriction where each CC in CA/DC must have the same subframe structure and numerology. However, in NR, it may be the case that different CCs have different subframe structures and/or numerologies, for example, as illustrated in FIGS. 12 and 13A-D. In this case, restricting in-band CCs to have the same link direction may become too restrictive, given the need for different numerologies which can be dynamic (e.g., URLLC services).

Figures 14A, 14B:
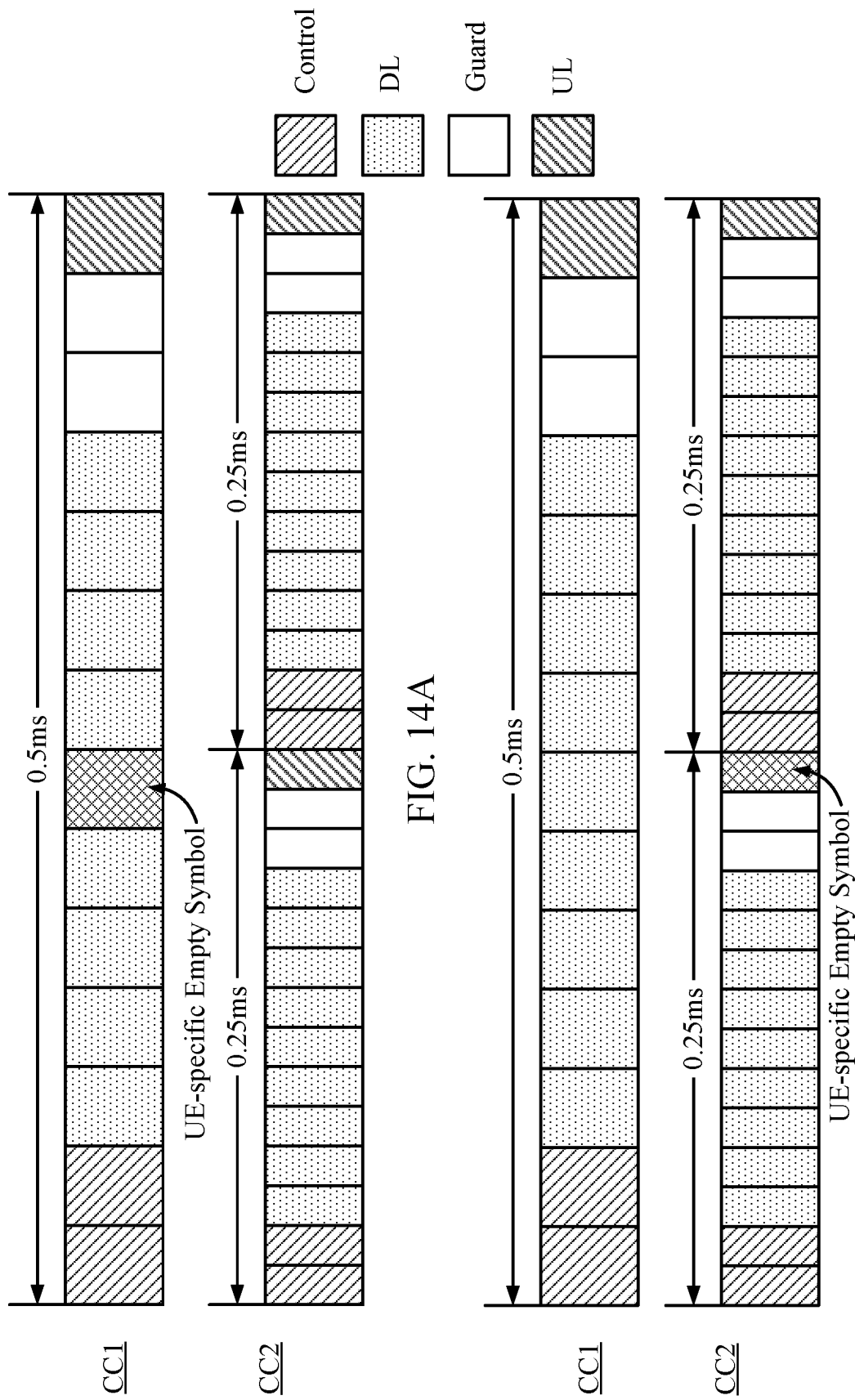
FIG. 14A-14B illustrates scheduling of empty symbols in a subframe transmitted on a component carrier, according to certain aspects of the present disclosure.

According to certain aspects, in the 5G case, in order to reduce interference between CCs, extra guard symbols or empty symbols may be introduced by a base station into the subframes transmitted on the CCs on a per-UE basis to ensure that, during a particular time, only a single link direction transmission occurs. For example, as illustrated in FIG. 14A, the subframe transmitted on CC1 may comprise a UE-specific empty symbol which ensures that, during the period of time of the UE-specific empty symbol, only the UL transmission on CC2 is occurring (e.g., instead of both a DL transmission of CC1 and an UL transmission on CC2 occurring at the same time). Additionally, FIG. 14B illustrates a UE-specific empty symbol in the subframe transmitted on CC2 which ensures that, during the period of time of the UE-specific empty symbol, only the DL transmission on CC1 is occurring (e.g., instead of both a DL transmission of CC1 and an UL transmission on CC2 occurring at the same time).

According to certain aspects, such guard/empty symbols may be dynamically created/scheduled by a base station depending on the combinations of CCs, and may be created/scheduled for one of the CCs depending on a scheduling need. According to certain aspects, if CC1 and CC2 are inter-band (e.g., CC1 and CC2 do not share the same band), no UE-specific empty symbols may be needed as CC1 and CC2 would not cause (or would minimally cause) interference with each other. As another example, if CC1 and CC2 are intra-band (e.g., CC1 and CC2 share the same band), and if the UE and/or the eNB is capable of in-band interference suppression or separation, no empty symbols may be needed as the UE/eNB would be able to suppress or separate interference caused by different-link-direction transmissions.

As noted above, a base station or a UE may schedule empty symbols in a subframe transmitted on a first CC to reduce interference in a second CC. The base station may provide (scheduling) information to a UE indicating the empty symbols. This indication/scheduling of empty symbols can be semi-static, or dynamic, on a per UE basis (e.g., since CA is usually UE-specific) or on a per cell basis. According to certain aspects, other UEs may still use the empty symbol of a CC (e.g., for a UL/DL transmission) if there is no link direction conflict for the other UEs, or the UEs or eNB has interference suppression capability.

According to certain aspects, one way to simplify carrier aggregation in 5G may be to group CCs based on the numerologies of the CCs. For example, it may be the case that a UE wants to transmit on plurality of CCs, each CC having a different numerology. In this case, a base station or the UE may identify a configuration of a plurality of CCs for communicating and then determine, from the plurality of CCs, a plurality of different CC groups based on a numerology criteria associated with each of the CCs that the UE wants to transmit on. The numerology criteria may comprise, for example, a subframe duration, a subframe structure, a symbol duration, a transmit time interval (TTI) duration, and/or a tone spacing of the CCs. For example, a first group of CCs may contain CCs using 15 kHz tone spacing, a second groups of CCs may comprise CCs using 30 kHz tone spacing, and a third group of CCs may comprise CCs using 60 kHz tone spacing. The UE and/or base station may then communicate using the plurality of different CC groups. According to aspects, grouping CCs based on numerology criteria may help alleviate interference between CCs with different numerologies, reduce complexity in downlink control and/or uplink control management, etc.

Figure 15:
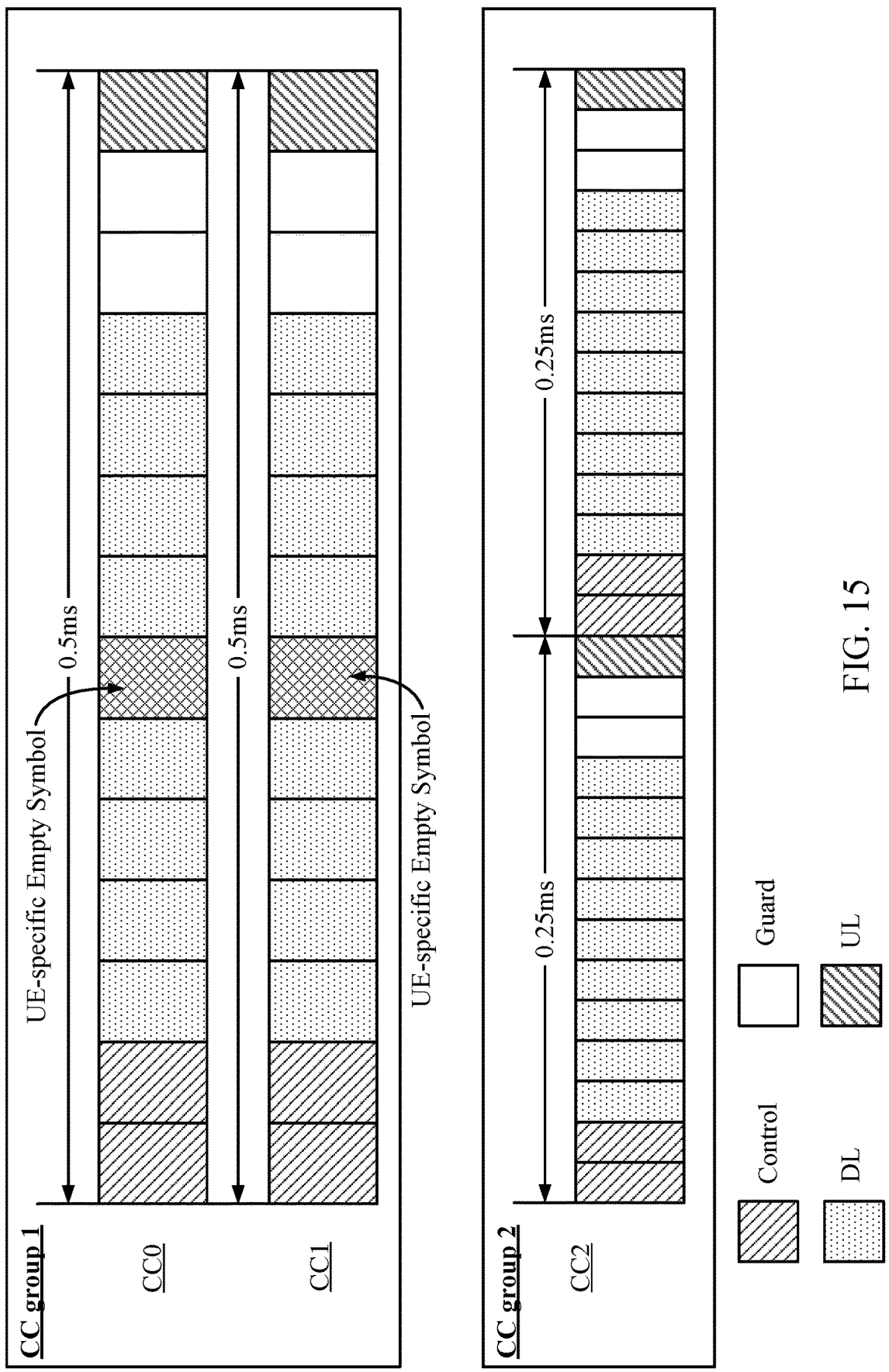
FIG. 15 illustrates grouping component carriers based on numerology, according to some aspects of the present disclosure.

FIG. 15 illustrates one example of CC grouping based on numerology, according to certain aspects of the present disclosure. For example, as illustrated in FIG. 15, CC0 and CC1, each having a subframe duration of 0.5 ms and 14 symbols, may be grouped into a first CC group (e.g., CC group 1), while CC2 having a subframe duration of 0.25 ms and 14 symbols may be grouped into a second CC group (e.g., CC group 2). Further, as illustrated, CC0 and CC1 may both comprise UE-specific empty symbols scheduled by the base station, for example, to ensure only a single link direction transmission is occurring at that time (e.g., the UL transmission in CC2). As noted, the UE-specific empty symbols may help reduce interference in CC2 when performing the UL transmission.

According to certain aspects, when grouping CCs based on numerology, cross-group control handling (e.g., which may include downlink or uplink scheduling, uplink control information transmission, etc.) in both the DL and the UL may not be allowed. This is similar to dual connectivity where different CCs are grouped in, for example, a first group and a second group, and the control signaling is separate for first and second groups. However, in some cases, cross-group control handling (e.g., cross-group scheduling, cross-group UCI feedback, etc.) may be used for link budget limited users.

According to certain aspects, without such grouping based on numerology, cross-numerology control handling may be used. For example, without such grouping, a 30 kHz based PUCCH may have to handle HARQ feedback for 15 kHz based PDSCH transmissions, which may become complicated due to the timing of operations on the 30 kHz CC versus the 15 kHz CC.

In some cases, it may be possible that control and data channels on a same CC may have different numerologies. In this case, the grouping may be based on either the control or data channels, or based on some explicit signaling to indicate to the UE how the grouping is performed. Additionally, in some cases, if the base station is the entity determining the plurality of different CC groups, the base station may receive an indication from a node (e.g., a UE) and may determine the plurality of different CC groups based on this indication. This indication may, for example, indicate which CCs the UE is requesting to communicate on.

According to certain aspects, grouping CCs based on numerology may also be performed dynamically. For example, in some cases, the numerology of a particular CC may change over time, sometimes on a per-subframe basis. Thus, in some cases, grouping of CCs may performed (e.g., by the base station) dynamically based on combinations of numerologies of a current subframe used to communicate in the wireless network. For example, in some cases, a first CC may have a first numerology at time t and may be grouped into a first group. At time t+1, the numerology of the first CC may change, which may trigger the base station to group the first CC into a different group.

Further, according to certain aspects, the grouping may be performed in either the CA context or the DC context. For example, in some cases, two or more groups may be enabled for CA. Likewise, two or more groups may be enabled for DC, making it a multi-connectivity (i.e., greater than or equal to 2), instead of dual connectivity.

According to certain aspects, regardless of the manner that the grouping is performed, the base station may transmit scheduling information to one or more UEs to allow the one or more UEs to communicate in the wireless network using the grouped CCs. For example, the scheduling information may include DL grants, UL grants, and/or group power control, which may allow the one or more UEs to communicate in the wireless network using the grouped CCs.

According to certain aspects, as CCs may use different numerologies, it may be beneficial (e.g., in terms of reducing complexity, interference management, and power control management) to have some sort of alignment in transmission time intervals (TTIs) across these CCs. For example, in some cases, TTI lengths may be defined over multiple CCs using the minimum tone spacing of a CC. In other words, TTI transmissions may be aligned (e.g., by the base station) at the symbol boundary level, for example, corresponding to the largest symbol duration of a subframe transmitted on the CC. For example, with reference to FIG. 15, consider a 33 µs symbol duration in CC1, and a 16.6 µs symbol duration in CC2, the TTI for DL and/or UL transmissions may be defined with a unit of 33 µs (e.g., 1-symbol in CC1, and 2-symbol in CC2).

According to certain aspects, aligning TTIs based on the largest symbol duration of a CC may be particularly beneficial for UL power-limitation related operations (e.g., power scaling). According to aspects, power limitation may refer to the case where the total requested or desired transmit power exceeds the max uplink transmit power, in which case, the requested or desired transmit power has to reduce to the max uplink transmit power (e.g., 23 dBm). Additionally, power limitation operations refers to the operation of reducing the originally requested or desired transmit power to the max power.

According to aspects, for example, power limitation may be done on a per max_symbol_duration basis across CCs. For example, with reference to FIG. 15, consider a 33 µs symbol duration in CC1, and 16.6 µs system duration in CC2, the power limitation operation (e.g., power scaling, etc.) may be performed (e.g., by the base station) on a per 33 us basis, implying that two 16.6 us symbols in CC2 always have the same power.

In some cases, power scaling/management may be performed by the base station on a per-TTI basis. It should be noted that the possible TTI length for a CC can still be a function of symbol durations of two or more CCs configured for CA or DC for a UE.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components, for example, as illustrated in FIG. 11A.

According to aspects, means for configuring, means for grouping, means for communicating, means for performing power scaling, means for aligning, and/or means for scheduling may comprise a processing system, which may include one or more processors and/or antennas, such as the transmit processor 420, the TX MIMO processor 430, the modulator(s) 432a-432t, and/or antenna(s) 434a-434t of the base station 110 illustrated in FIG. 4 and/or the transmit processor 464, the TX MIMO processor 466, the modulator(s) 454a-454r, and/or antenna(s) 452a-452r of the user equipment 120 illustrated in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Further, it should be appreciated that modules and/or other appropriate means for performing the methods and techniques described herein can be downloaded and/or otherwise obtained by a user equipment and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user equipment and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a wireless communications device in a wireless network, comprising:
identifying a configuration of a plurality of component carriers (CCs) for communicating, wherein the plurality of CCs comprise a first CC and a second CC;
determining, from the plurality of CCs, a plurality of different CC groups based on a numerology criteria associated with each CC of the plurality of CCs, wherein determining the plurality of different CC groups based on the numerology criteria comprises grouping the second CC in a different CC group of the plurality of different CC groups than the first CC based on the second CC having a different subframe duration, symbol duration, transmit time interval (TTI) duration, or tone spacing than the first CC; and
communicating using the plurality of different CC groups.

2. The method of claim 1, wherein the plurality of CCs are in one of a carrier aggregation (CA) mode or a dual-connectivity (DC) mode.

3. The method of claim 1, wherein:
the numerology criteria is scalable.

4. The method of claim 1, wherein determining the plurality of groups comprises grouping the plurality of CCs into the plurality of different CC groups dynamically based on combinations of numerologies of a current subframe.

5. The method of claim 1, wherein the wireless communications device comprises a base station, and further comprising transmitting scheduling information to one or more UEs to facilitate the one or more UEs to communicate with the base station using the plurality of different CC groups.

6. The method of claim 1, wherein the wireless communications device comprises a base station, and further comprising:
receiving an indication from a user equipment (UE), indicating CCs that the UE is requesting to communicate on; and
determining the plurality of different CC groups based further on the indication.

7. The method of claim 1, wherein the plurality of different CC groups comprises a first CC group comprising at least the first CC and a second CC group comprising at least the second CC, and wherein the first CC and the second CC comprise intra-band CCs and further comprising scheduling one or more empty symbols in the first CC to reduce interference in the second CC.

8. The method of claim 7, wherein at least one of:
the scheduling of the one or more empty symbols is based on a scheduling need;

the scheduling is semi-static or dynamic on at least one of a per user equipment (UE) or per cell basis; or the scheduling is based on scheduling information indicating a location of the one or more empty symbols.

9. The method of claim 1, wherein determining the plurality of groups is further based on a type of channel to be transmitted on different CCs, and wherein types of channels comprise at least one of a control channel or a data channel.

10. The method of claim 1, wherein the at least one processor is further configured to group based on a type of channel to be transmitted on different CCs, and wherein types of channels comprise at least one of a control channel or a data channel.

11. A method for wireless communications by a wireless communications device in a wireless network, comprising:
identifying a configuration of a plurality of component carriers (CCs) for communicating;
determining, from the plurality of CCs, a plurality of different CC groups based on a numerology criteria associated with each CC of the plurality of CCs, wherein the plurality of different CC groups comprises a first CC group comprising at least a first CC and a second CC group comprising at least a second CC, wherein the first CC comprises a first symbol duration and the second CC comprises a second symbol duration different than the first symbol duration, and wherein determining the plurality of different CC groups based on the numerology criteria comprises:
grouping the first CC in the first CC group based on the first CC having the first symbol duration; and
grouping the second CC in the second CC group based on the second CC having the second symbol duration; and
communicating using the plurality of different CC groups.

12. The method of claim 11, further comprising performing power scaling on the first CC and the second CC based on a largest symbol duration between the first symbol duration and the second symbol duration.

13. The method of claim 11, further comprising determining a transmission time interval (TTI) based on a largest symbol duration between the first symbol duration and the second symbol duration.

14. The method of claim 11, further comprising performing power scaling on a per transmission time interval (TTI) basis for the first CC and second CC.

15. An apparatus for wireless communications in a wireless network, comprising:
at least one processor configured to:
identify a configuration of a plurality of component carriers (CCs) for communicating, wherein the plurality of CCs comprise a first CC and a second CC;
determine, from the plurality of CCs, a plurality of different CC groups based on a numerology criteria associated with each CC of the plurality of CCs, wherein the at least one processor is configured to determine the plurality of different CC groups based on the numerology criteria by being configured to group the second CC in a different CC group of the plurality of different CC groups than the first CC based on the second CC having a different subframe duration, symbol duration, transmit time interval (TTI) duration, or tone spacing than the first CC; and
communicate using the plurality of different CC groups; and
a memory coupled with the at least one processor.

16. The apparatus of claim 15, wherein the plurality of CCs for communications are in one of a carrier aggregation (CA) mode or a dual-connectivity (DC) mode.

17. The apparatus of claim 15, wherein:
the numerology criteria is scalable.

18. The apparatus of claim 15, wherein the at least one processor is configured to group the plurality of CCs into the plurality of different CC groups dynamically based on combinations of numerologies of a current subframe used to communicate in the wireless network.

19. The apparatus of claim 15, wherein the apparatus comprises a base station, and wherein the at least one processor is further configured to transmit scheduling information to one or more UEs to allow the one or more UEs to communicate with the base station using the plurality of different CC groups.

20. The apparatus of claim 15, wherein the apparatus comprises a base station, and wherein the at least one processor is further configured to:
receive an indication from a user equipment (UE), indicating CCs that the UE is requesting to communicate on; and
determine the plurality of different CC groups based further on the indication.

21. The apparatus of claim 15, wherein the plurality of different CC groups comprises a first CC group comprising at least the first CC and a second CC group comprising at least the second CC, and wherein the first CC and the second CC comprise intra-band CCs and wherein the at least one processor is further configured to schedule one or more empty symbols in the first CC to reduce interference in the second CC.

22. The apparatus of claim 21, wherein at least one of:
the scheduling of the one or more empty symbols is based on a scheduling need;
the scheduling is semi-static or dynamic on at least one of a per user equipment (UE) or per cell basis; or
the scheduling is based on scheduling information indicating a location of the one or more empty symbols.

23. An apparatus for wireless communications in a wireless network, comprising:
at least one processor configured to:
identify a configuration of a plurality of component carriers (CCs) for communicating;
determine, from the plurality of CCs, a plurality of different CC groups based on a numerology criteria associated with each CC of the plurality of CCs, wherein the plurality of different CC groups comprises a first CC group comprising at least a first CC and a second CC group comprising at least a second CC, wherein the first CC comprises a first symbol duration and the second CC comprises a second symbol duration different than the first symbol duration, and wherein the at least one processor is configured to determine the plurality of different CC groups based on the numerology criteria by being configured to:
group the first CC in the first CC group based on the first CC having the first symbol duration; and
group the second CC in the second CC group based on the second CC having the second symbol duration; and
communicate using the plurality of different CC groups; and
a memory coupled with the at least one processor.

24. The apparatus of claim 23, wherein the at least one processor is further configured to perform power scaling on the first CC and the second CC based on a largest symbol duration between the first symbol duration and the second symbol duration.

25. The apparatus of claim 23, wherein the at least one processor is further configured to determine a transmission time interval (TTI) based on a largest symbol duration between the first symbol duration and the second symbol duration.

26. The apparatus of claim 23, wherein the at least one processor is further configured to perform power scaling on a per transmission time interval (TTI) basis for the first CC and second CC.

* * * * *